(12) United States Patent
Miller et al.

(10) Patent No.: US 6,925,582 B2
(45) Date of Patent: Aug. 2, 2005

(54) FORWARDING OF DIAGNOSTIC MESSAGES IN A GROUP

(75) Inventors: Robert Miller, Rochester, MN (US); Vicki Lynn Morey, Pine Island, MN (US); Kiswanto Thayib, Rochester, MN (US); Laurie Ann Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 09/920,470

(22) Filed: Aug. 1, 2001

(65) Prior Publication Data

US 2003/0028822 A1 Feb. 6, 2003

(51) Int. Cl.⁷ .................................................. G06F 11/00
(52) U.S. Cl. ............................................ 714/25; 714/4
(58) Field of Search ....................................... 714/4, 25

(56) References Cited

U.S. PATENT DOCUMENTS

| | | | |
|---|---|---|---|
| 5,347,524 A | * | 9/1994 | I'Anson et al. ............... 714/39 |
| 5,590,277 A | | 12/1996 | Fuchs et al. |
| 5,704,031 A | | 12/1997 | Mikami et al. |
| 5,748,882 A | | 5/1998 | Huang |
| 5,748,883 A | | 5/1998 | Carlson et al. |
| 5,805,785 A | | 9/1998 | Dias et al. |
| 5,828,836 A | | 10/1998 | Westwick et al. |
| 5,991,518 A | | 11/1999 | Jardine et al. |
| 6,108,699 A | | 8/2000 | Moiin |
| 6,115,393 A | * | 9/2000 | Engel et al. ................ 370/469 |
| 6,151,688 A | | 11/2000 | Wipfel et al. |
| 6,192,483 B1 | | 2/2001 | Moiin et al. |
| 6,243,814 B1 | | 6/2001 | Matena |
| 6,314,526 B1 | | 11/2001 | Arendt et al. |
| 6,393,485 B1 | | 5/2002 | Chao et al. |
| 6,438,705 B1 | | 8/2002 | Chao et al. |
| 6,442,713 B1 | | 8/2002 | Block et al. |
| 6,449,641 B1 | | 9/2002 | Moiin et al. |
| 6,460,149 B1 | | 10/2002 | Rowlands et al. |
| 6,493,715 B1 | | 12/2002 | Funk et al. |
| 6,526,521 B1 | | 2/2003 | Lim |
| 6,718,486 B1 | | 4/2004 | Roselli et al. |
| 6,721,274 B2 | * | 4/2004 | Hale et al. ................... 370/235 |
| 6,763,023 B1 | * | 7/2004 | Gleeson et al. ............. 370/392 |
| 2002/0075841 A1 | * | 6/2002 | Steer et al. .................. 370/344 |
| 2004/0083299 A1 | * | 4/2004 | Dietz et al. ................. 709/230 |

* cited by examiner

*Primary Examiner*—Dieu-Minh Le
*Assistant Examiner*—Michael Maskulinski
(74) *Attorney, Agent, or Firm*—Bracewell & Patterson, LLP

(57) ABSTRACT

A system and method in data processing networks with distributed processing or multiple nodes provide a capability to insure that the protocols implicated in a first or original protocol are identified so that diagnostic messages sent during execution of that protocol are traceable. Thus, each of the diagnostic messages are delivered to the requestor of the original protocol before the original request completes. A linkage is provided between the original protocol and all protocols nested within it.

12 Claims, 2 Drawing Sheets

① wish to send message in P2. Looks at message header H.

FORWARDING OF DIAGNOSTIC MESSAGES IN A GROUP

BACKGROUND OF THE INVENTION

1. Technical Field

The present invention relates in general to data processing and, in particular, to protocols between groups within a data processing system. Still more particularly, the present invention relates to forwarding of diagnostic messages from one member of the group to another.

2. Description of the Related Art

Data processing systems or networks with distributed processing have utilized certain operating rules. The rules are used, for example, in managing the overall network, the transfer of data between the nodes and for control and synchronization purposes. These rules, their meaning and sequencing are known as protocols. Protocols are typically organized into groups based on the part of the system to which they relate. At times during the execution of a protocol, other protocols might become involved. The protocol originally in execution or performance is typically referred to as a first or original protocol. When an original protocol required a response from some other protocol, that other protocol is referred to as a nested protocol.

A nested protocol is thus a protocol that is invoked from another protocol, the invoking or original protocol. The nested protocol by definition completes before the original protocol completes, so the nested protocol is contained within the originating protocol. A nested protocol might be another protocol within the same group, or it might be a protocol of a different group. Further, a nested protocol to an original protocol might require a response from still another nested protocol. This multiple nesting of protocols formed what were termed layers of protocols. Layers of protocols could extend several layers deep.

During the execution of either original protocol or nested protocols, a member of the network which is participating in the protocol often may have need to send certain types of messages to the protocol originating member. Typical of such messages are those which indicate errors, partial completion, additional information, warning information and the like.

These types of messages can be termed diagnostic messages to differentiate them from other messages which members might want to send as part of a protocol. Diagnostic messages are intended to be seen by the protocol originator.

It was often the case, however, that the message-requesting member, or requestor node, lacked adequate information as to why a request failed, particularly in the case of nested protocols. The requestor node typically had to go to each node that was a participating member in order to obtain the required information, or go to another source, such as a message log, searching for all diagnostic messages pertaining to the original request. In the case of nested protocols, the nested protocol requester was not the same as the original protocol requester.

There were other problems with the original requestor node trying to get all of the diagnostic messages in these situations. The requestor node might not know the identity of all members that participated in the protocol; or the identity of all groups; or which, if any, nested protocols were involved. When a nested protocol used a "hidden" group, such as a file manager or resource manager, the user/requestor had no knowledge about the existence or use of that group and that group was not accessible to the user. Thus, the requester node lacked a user interface to retrieve diagnostic messages. In some cases, a group may not have been configured to keep logs of diagnostic messages. Further, it was not easy to relate nested protocols to each other when they were executed and came from different groups. It would thus be desirable to provide a data processing system and method that would indicate the relation of diagnostic messages during the execution of protocols in data processing networks.

SUMMARY OF THE INVENTION

It is an object of the present invention to provide a computer system and method of formatting diagnostic messages in a group.

It is a further object of the present invention to provide a computer system and method of forward diagnostic messages to each member of a group involved in the protocols, even in the case nested protocols are involved.

It is yet another object of the present invention to provide diagnostic messages in a computer system and method which identify the member(s) and group(s) involved in protocols, even in the case nested protocols are involved.

In accordance with the present invention, a data processing system and method forward diagnostic messages among members of groups of the system while the members are executing protocols so that the diagnostic messages are provided to each of these members involved in the protocol, particularly when nested protocols are being performed. A header is attached to the diagnostic message in addition to the conventional headers and data content of the message. The attached header includes data fields of a protocol handle identifying the protocol from which a request originated, as well as a forwarding handle identifying, where present, a protocol which is the current parent of the originating protocol. The diagnostic message is sent to the member of the group identified by the forwarding handle. If the forwarding handle field is null, the protocol is an original protocol. Otherwise, the protocol is a nested protocol. The header to the message also includes an identifier of the member and group which activated the message and, where applicable, an identifier of the member and group of the parent protocol originator. In this manner, each of the diagnostic messages is delivered to the original requestor before the original request completes.

The foregoing and other objects and advantages of the present invention will be apparent to those skilled in the art, in view of the following detailed description of the preferred embodiment of the present invention, taken in conjunction with the appended claims and the accompanying drawings.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
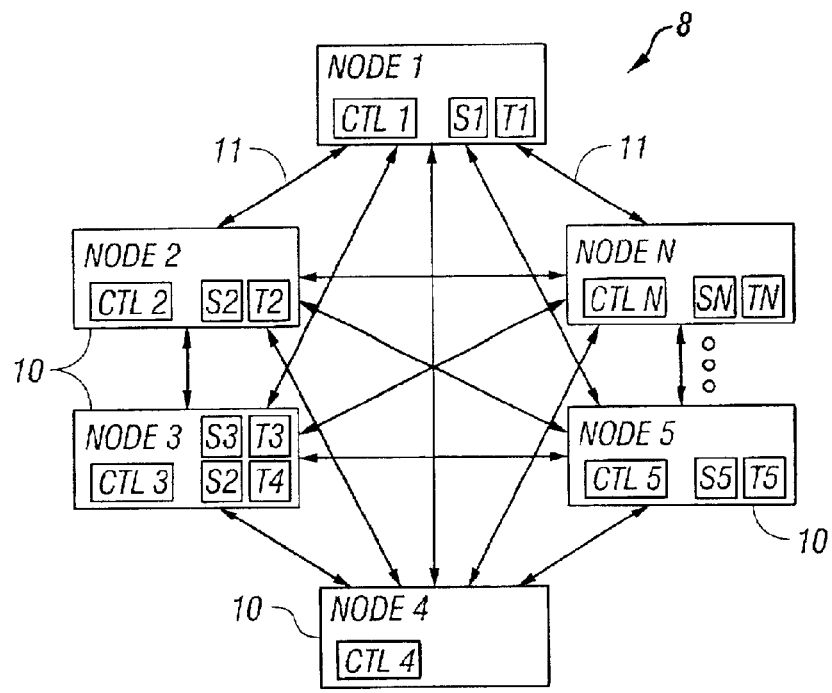
FIG. 1 is a schematic block diagram of a clustered computer system according to the present invention.

With reference now to the figures and in particular as shown in FIG. 1, for example, a clustered computer system 8 may include a plurality of nodes 10 interconnected with one another via a network of interconnections 11. Any number of network topologies commonly utilized in clustered computer systems may be used consistent with the present invention. Moreover, individual nodes 10 may be physically located in close proximity with other nodes, or may be geographically separated from other nodes, e.g., over a wide area network (WAN), as is well known in the art.

The principles of the invention are in the preferred embodiment set forth as they may apply to various clustering environments of data processing systems or computers, where multiple nodes collectively perform tasks, and typically present a single system image to external devices and users. A wide variety of clustering environments and clustering infrastructures may be utilized in connection with the invention.

In the context of a clustered computer system, at least some computer tasks are performed cooperatively by multiple nodes executing cooperative computer processes (referred to herein as "jobs") that are capable of communicating with one another. Such cooperative jobs are logically organized into a "group," with each cooperative job being designated as a "member" of the group. Group members, however, need not necessarily operate on a common task—typically all that is required for members of a group is that such members be capable of communicating with one another during execution.

FIG. 1, for example, illustrates the computer system 8 as an exemplary cluster of nodes 10, also denoted herein for purposes of example by the sequential identifiers 1, 2, 3 ... N. Resident within various nodes are a plurality of jobs S1–SN and T1–TN forming the members of an exemplary pair of groups in the clustered computer system.

As shown in this figure, nodes in a clustered computer system are not required to participate in all groups (e.g., as with node 4). Moreover, multiple jobs from a given group may be resident in the same node (e.g., as with node 3).

Also illustrated in FIG. 1 is an optional feature in the way of an exemplary cluster control group, including a group member, referred to herein as a cluster control (CTL) job, resident on every node participating in the cluster (e.g., jobs CTL-1-CTLN, resident respectively on nodes 1-N). Most, if not all, conventional clustering environments incorporate functionality analogous to a cluster control group, which typically manages various cluster functions such as starting and ending nodes, adding or removing nodes to or from a cluster, etc., and which typically requires that a member job be resident on each node participating in a cluster. Moreover, it is anticipated that each node participating in a cluster will incorporate lower-level functionality, referred to herein as either the clustering infrastructure or clustering resource services, which handles basic clustering functionality, e.g., inter-node communications, message ordering, heartbeat monitoring, etc. It should be understood that the cluster control group is not required, and that the present invention does not depend on the presence of CTL features.

It will be appreciated that nomenclature other than that specifically used herein to describe the handing of computer tasks by a clustered computer system may be used in other environments. Therefore, the invention should not be limited to the particular nomenclature used herein, e.g., as to protocols, requests, messages, jobs, groups, etc.

Figure 2:
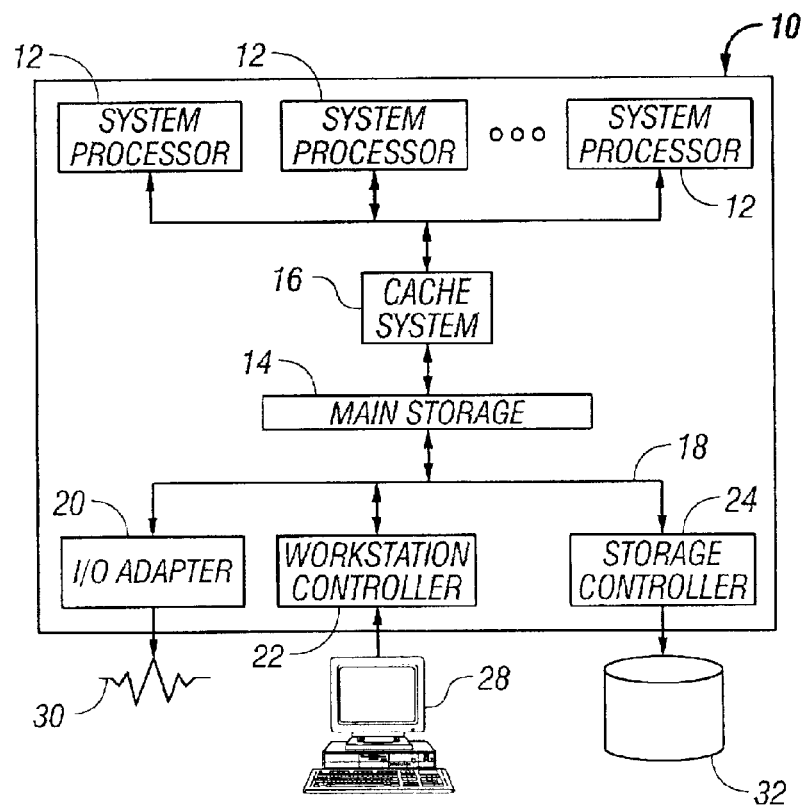
FIG. 2 is a node of the clustered computer system of FIG. 1.

Now turning to FIG. 2, an exemplary hardware configuration for one of the nodes 10 in clustered computer system 8 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in programmable electronic devices (e.g., incorporating embedded controllers and the like).

Node 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network 30), one or more workstations 28, and/or one or more storage devices such as a direct access storage device (DASD) 32. Any number of alternate computer architectures may be used in the alternative.

In operation of the computer system 8, execution or performance of protocols for managing system operations of the members of the various groups in system 8 often gives rise to nested protocols. During execution of protocols of any type, one or more members of the network illustrated in system 8 often have need to send diagnostic messages to other members implicated in the protocol. Examples of such diagnostic messages are those indicating errors, partial completion, additional information, warning information and the like. There have in the past been problems, noted above, in the case of nested protocols where the requesting node experienced difficulty in locating which members of which groups were operating or involved in a protocol in order to receive diagnostic messages from each such node.

Within the present invention, a method and system are provided that automatically forward diagnostic messages to the original requester in the computer system 8. Diagnostic messages are formatted in a manner in which they are associated with a unique request identifier or handle that was assigned to the original request. Forwarding of diagnostic messages formed according to the present invention is based on the original request handle or identifier. Additionally, each of the diagnostic messages is delivered to the original requestor before the original request completes.

Figure 3:
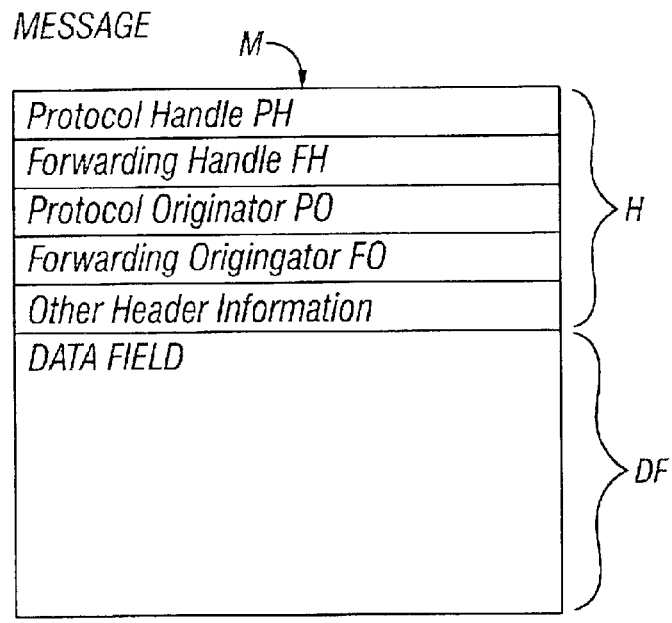
FIG. 3 is a schematic diagram of a message format for a diagnostic message according to the present invention used in the computer system of FIG. 1.

FIG. 3 of the drawings depicts a message format M for a diagnostic message according to the present invention interchanged between different groups in the cluster of computer system 8. The message M is identified by the presence of data in a header H containing a protocol handle PH or identifier and a forwarding handle FH or identifier. The header H is formed in the job SN in the processors 12 of the nodes 10 in system 8. The other header information in the header H included by job SN in the processors 12 according to the present invention for the message is in the form of an identifier field for a protocol originator PO that distributes the request to the group, and an identifier field containing in the case of a nested protocol the identifier of the forwarding originator FO. For an original request, the field for the forwarding originator FO is null. The number of bits in the header H may be any suitable member, depending in part on the number of members and groups in system 8. The particular code used may be of conventional type. The header H in addition may also include, if necessary, other conventional header information like that normally included in diagnostic messages. The remaining portion of the message M is the data field DF containing the information content of the diagnostic message in conventional format.

Thus, it can be seen that each message M or request furnished according to the present invention has two request identifiers or handles; a protocol handle PH and a forwarding handle FH. Both identifiers or handles are some suitable form of unique identifiers or UID's. In the preferred embodiment universal unique identifiers, or UUIDs are utilized. Each protocol request is assigned a unique protocol handle PH accordingly. Each nested protocol utilizes the protocol handle PH as its forwarding identifier or handle FH.

Additionally, according to the present invention, each request has two requestor fields, a protocol originator field PO and a forwarding originator field FO, which together indicate the member or node, and group, of that member, that made the request. Formation of headers H for the messages M according the present invention interchanging the computer system 8 is accomplished in the following manner.

When an original request is made, that request has the following characteristics:

the request has a unique protocol handle PH;

the forwarding handle FH is null;

the protocol originator PO is the member M of group G that distributed the request; and the forwarding originator FO is null.

When a nested protocol is requested according to the present invention, the request has the following characteristics:

the requested protocol has a unique protocol handle PH;

the forwarding handle FH is set to the current protocol handle PH of the parent protocol;

the protocol originator PO is the member M of group G that distributed the request; and the forwarding originator FO is the member M of group G in the parent protocol originator PO.

As will be set forth in greater detail by the following example, a chain or linkage is thus formed between all nested protocols and the original protocol, since the header H of the message M carries the following information:

the protocol handle PH contains an identifier of the requested protocol;

the forwarding handle FH contains the identifier of the parent protocol, if any;

the protocol originator PO contains an identifier of the member M and group that distributed the request; and the forwarding originator FO contains an identifier of the member M and group of the parent protocol (if any) originator.

Figure 4:
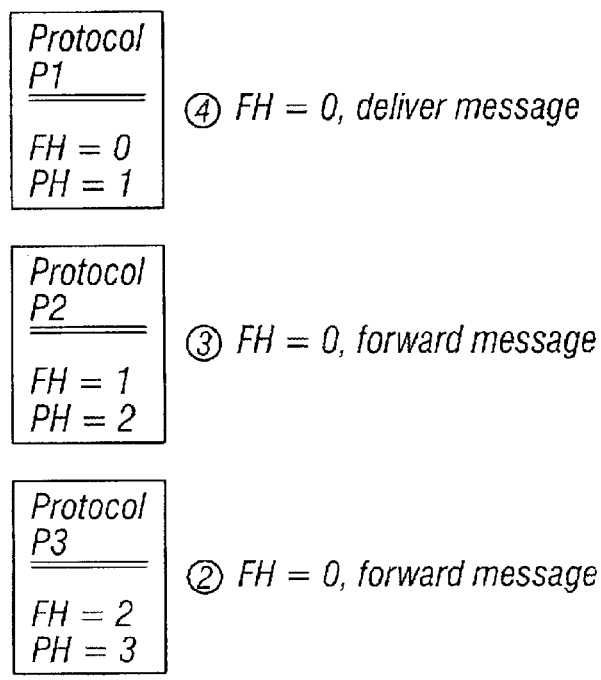
FIG. 4 is a schematic diagram of an example sequence of diagnostic forwarding according to the present invention.

In FIG. 4 forwarding of diagnostic messages is depicted schematically for an example sequence in the structure of FIG. 1. A member M1 of a group in FIG. 4 is represented by job S1 on Node 1. Job S1 is thus member 1 of group S in FIG. 1. Member M2 of group G2 of FIG. 4 is represented by job T2 on Node 2 in FIG. 1. Job T2 is member 2 of group T in FIG. 1. Thus, in FIG. 4, a diagnostic message, for example, is sent from member M1 of group G1 at a time when a protocol P3 involving member M2 of group G2 is being processed. Protocol P3 is a nested protocol within protocol P2, which is in turn a nested protocol within an originating protocol P1. Thus, there are two layers of nested protocols: P2 within originating protocol P1, and involving member M2 of group G1; and nested protocol P3 within protocol P2 and involving member M2 of group G2.

According to the present invention, each of the implicated protocols, originating protocol P1 and nested protocols P2 and P3, are identified and traceable so that the diagnostic message M is forwarded to all involved protocols.

As is shown in FIG. 4, nested protocol P2 is identifiable by the header H, which is of the format set forth below in Chart 1:

Chart 1

Protocol Handle PH=3

Forwarding Handle FH=2

Protocol Originator PO=M2/G2 (Member 2 of Group 2) or Job T2 in FIG. 1

Forwarding Originator FO=M2/G1 (Member 2 of Group 1) or Job S2 in FIG. 1

Protocol P2 is a nested protocol within a protocol P1 as identified by the forwarding handle FH of the message M and is in turn a nested protocol within protocol P1, as indicated by the forwarding handle portion of the message it sends in response, according to the following Chart 2:

Chart 2

Protocol Handle PH=2

Forwarding Handle FH=1

Protocol Originator PO=M2/G1 (Member 2 of Group 1) of Job S2 of FIG. 1

Forwarding Originator FO=M1/G1 (Member 1 of Group 1) or Job S1 of FIG. 1

Protocol P1 is an original protocol as is indicated by the forwarding handle FH being null as set forth in Chart 3 below:

Chart 3

Protocol Handle PH=1

Forwarding Handle FH=O

Protocol Originator PO=M1/G1 (Member 1 of Group 1) or Job S1 of FIG. 1

Forwarding Originator FO=0 (Null)

Thus, in the foregoing example, nested protocol P2 sends a diagnostic message and the requester of computer system 8 looks at the forwarding originator FO identifier and the forwarding handle FH content of the diagnostic message M sent. If these portions of the diagnostic message M contain information and are not null, then the diagnostic message is sent to that member identified by the forwarding handle FH portion of the header H of the message M. The foregoing process is repeated until presence of a null in the forwarding handle identifies an original protocol. At that time, all implicated protocols have been identified, so that they are in effect traceable according to the present invention.

In turn, that identified member M1 of group G1 examines the incoming diagnostic message to determine if the forwarding handle FH portion of the diagnostic message M has another forwarding handle FH to which it is to be forwarded. Thus, a diagnostic message containing the nested protocol P2 is sent to member M2 of group G2 the protocol originator PO with protocol handle PH of 3.

When the diagnostic message comes in, the cluster examines if there is a non-null forwarding handle FH for this protocol handle PH. As can be seen from the foregoing example, such is the case. Thus, the diagnostic message M is again forwarded to the forwarding originator identified by the forwarding originator portion FO of the diagnostic message which contains a protocol identifier or handle 2. The protocol originator member M2 of group G1 receives the diagnostic message and since it has a protocol handle PH of 2, the cluster follows the procedure described above. Again there is a non-null forwarding handle FH so the Diagnostic Message is forwarded to member M1 of group G1 with a protocol handle PH of 1. In the diagnostic message received by member M1 of group G1 the forwarding handle is null, so this member is the original protocol requested.

From the foregoing, it can be seen that the method and system of the present invention offer several advantages. All diagnostic messages are sent and collected on the node of the requester member. Further, the requester needs much less logging capability since all related diagnostic messages are delivered to the original requestor. In addition, the present invention avoids problems in the prior art of having the original protocol explicitly forward messages, a procedure which can be error-prone and cannot be extended. The prior art technique of protocol forwarding was not capable of forwarding messages and it would have to be extensively revised and reprogrammed in order to do so. Further, the method and system of the present invention permits all diagnostics to be collected by the requester, even when the requesting protocol may not even have any indication that it is requesting a second protocol.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of forwarding diagnostic messages among members of groups in a data processing system while the members are executing protocols, comprising the steps of:
    attaching a header to the message, the header including the following header fields:
        (1) a protocol handle identifying the originator protocol from which the request originated; and
        (2) a forwarding handle of null value identifying, if present, an original protocol which is the current parent of the protocol;
    sending the diagnostic message to the member of the group identified by the forwarding handle which originated the protocol.

2. The method of claim 1, further including the step of:
    including in header to the message an identifier of the member and group which originated the message.

3. The method of claim 1, further including the step of:
    including in the header to the message an identifier of the member and group of the parent protocol originator, if any, which originated the message.

4. A computer system including a plurality of groups, each group composed of one or more members, said computer system forwarding diagnostic messages among the members of the groups and including:
    means for forming a message including in its header message the following header fields:
        (1) a protocol handle identifying the originator protocol from which the request originated; and
        (2) a forwarding handle of null value identifying, if present, an original protocol which is current parent of the protocol:
            means for sending the diagnostic message to the member of the group identified by the forwarding handle which originated the protocol.

5. The computer system of claim 4, which said means for forming a header message further includes:
    means for including in the header to the message an identifier of the member and group which originated the diagnostic message.

6. The computer system of claim 4, wherein said means for forming a header message further includes:
    means for including in the header to the message an identifier of the member and group of the parent protocol originator, if any, which originated the diagnostic message.

7. A computer memory element containing stored in signal bearing media a diagnostic message to be forwarded among members of one or more groups in a computer system and utilized therein, the stored diagnostic message containing a header message including the following header fields:
    (1) a protocol handle identifying the originator protocol from which the request originated;
    (2) a forwarding handle of null value identifying, if present, an original protocol which is the current parent of the protocol; and
    instructions for sending the diagnostic message to the member of the group identified by the forwarding handle which originated the protocol.

8. The computer memory element of claim 7, wherein the header message contained in the stored diagnostic message further includes:
    an identifier of the member and group which originated the diagnostic message.

9. The computer memory element of claim 7, wherein the header message contained in the stored diagnostic message further includes:
    an identifier of the member and group of the parent protocol originator, if any, which originated the diagnostic message.

10. A method of forwarding diagnostic messages among members of groups in a data processing system to those members executing protocols implicated by the message, comprising the steps of:
    forwarding as part of the diagnostic message a header including the following header fields:
        (1) a protocol handle identifying the originator protocol from which the request originated; and
        (2) a forwarding handle identifying, if present, a protocol which is the current parent of the protocol;
    examining the forwarding handle at each member of the groups of the system to ascertain if that member was a parent of the protocol identified in the forwarding handle field of the header of the diagnostic message;
    forwarding another diagnostic message having a header including the following header fields:
        (1) a protocol handle identifying the originator protocol from which the request originated; and
        (2) a forwarding handle identifying, if present, a protocol which is the current parent of the protocol.

11. The method of claim 10, further including the step of:
    sending the diagnostic message to the member of the group identified by the forwarding handle of another diagnostic message.

12. The method of claim 11, further including the step of:
    repeating the steps of claims 12 and 14 until the forwarding handle of the header field indicates the protocol is an original protocol.

* * * * *